United States Patent
Weiland

(10) Patent No.: US 6,227,488 B1
(45) Date of Patent: May 8, 2001

(54) MOBILE FAN FOR HOT AIR BALLOONS

(76) Inventor: Darrell O Weiland, 11595 Oak Hills Dr., Bentonville, AR (US) 72712

( * ) Notice: Subject to any disclaimer, the term of this patent is extended or adjusted under 35 U.S.C. 154(b) by 0 days.

(21) Appl. No.: 08/940,127

(22) Filed: Oct. 1, 1997

(51) Int. Cl.$^7$ .................................................. B64B 1/58
(52) U.S. Cl. ............................................ 244/98; 52/2.11
(58) Field of Search .................................. 244/98, 97, 30, 244/31; 454/71, 76; 416/63, 246; 417/234; 169/52; 52/2.11, 2.17

(56) References Cited

U.S. PATENT DOCUMENTS

| | | |
|---|---|---|
| Re. 33,638 | 7/1991 | Lilliston, Sr. et al. . |
| 1,874,573 | 8/1932 | Moore . |
| 2,004,571 | 6/1935 | De Bothezat . |
| 2,108,738 | 2/1938 | Allen . |
| 2,255,908 | 9/1941 | Anderson . |
| 2,746,674 | 5/1956 | Alldritt et al. . |
| 2,781,963 | 2/1957 | Faber . |
| 2,910,994 | * 11/1959 | Joy ......................................... 52/2.11 |
| 3,185,122 | 5/1965 | Pleuger . |
| 4,018,406 | * 4/1977 | Parsons ................................. 244/98 |
| 5,082,465 | * 1/1992 | Wine ..................................... 440/37 |
| 5,685,122 | * 11/1997 | Brisbane et al. ...................... 52/2.11 |
| 5,769,021 | * 6/1998 | Schad .................................... 440/37 |

* cited by examiner

Primary Examiner—Galen L. Barefoot
(74) Attorney, Agent, or Firm—Head, Johnson & Kachigian

(57) ABSTRACT

A mobile blower or fan is used to inflate the envelope portion of a hot air balloon. The fan includes a propeller which is driven by a gasoline/fuel engine and the engine is mounted on a wheeled base and is covered by an encompassing cage. By means of wheels attached to the base, it is possible to move the fan or blower on all types of terrain as needed.

1 Claim, 2 Drawing Sheets

MOBILE FAN FOR HOT AIR BALLOONS

BACKGROUND OF THE INVENTION

This invention relates to the hot air balloon industry and more particularly to means and method of improving the inflation of the balloon portion otherwise known as the envelope of the hot air balloon apparatus.

Within the hot air balloon industry, the balloon portion otherwise known as the envelope is inflated by means of a fan or blower. Historically, the envelope is inflated manually by flapping its opening up and down in order to trap air inside. Since the onset of gasoline powered fans, they have been the primary means to inflation.

When inflating an envelope, care needs to be given so that a minimal amount of debri and other harmful and damaging matter enters the inside of the envelope by means of the air stream produced by the fan. Further, since engine exhaust is harmful to the envelope's fabric, care must be given to minimize such exposure.

Present fans are designed so that the propeller is mounted close to the ground with its engine mounted directly in line of the air flow which enters into the envelope.

SUMMARY OF THE INVENTION

The present inventive improvements relate to a mobile fan used to inflate an envelope portion of a hot air balloon apparatus. Such fan comprises of a propeller driven by a gasoline/fuel engine which is mounted on a wheeled base. The fan assembly may be covered by an encompassing cage and may be moved around place to place as needed or found to be desirable. In contrast to the conventional methods of inflating an envelope, where fans or blowers are mounted on a base close to the ground with its engines mounted directly in line of the air flow, the present invention provides a relatively large self-contained and totally mobile fan. Its applications include the following advantages:

1. With the engine located below the fan, the engine does not restrict the air flow of the fan. It is particularly important so that the inflation time of the envelope is minimized. Further, since the engine exhaust is harmful to the envelope's fabric, by placing the engine below the fan, the exhaust which enters the air stream is minimized.

2. That the fan is mounted high enough above the ground surface so that debris and other matter are not pulled into the air stream and blown into the envelope. This is particularly important because debris or other matter can puncture the envelope's fabric as well as catch fire and burn holes within the envelope.

As indicated above, debris and engine exhaust is not only harmful to the envelope, but also to the ground crew personnel holding the envelope during the inflation period. The present invention proposes to deal with these problems.

BRIEF DESCRIPTION OF THE DRAWINGS

The invention will be better understood and objects other than set forth above will become apparent when consideration is given to the following detailed description thereof Such description makes reference to the annex drawings wherein.

DETAILED DESCRIPTION OF THE PREFERRED EMBODIMENT

Figure 1:
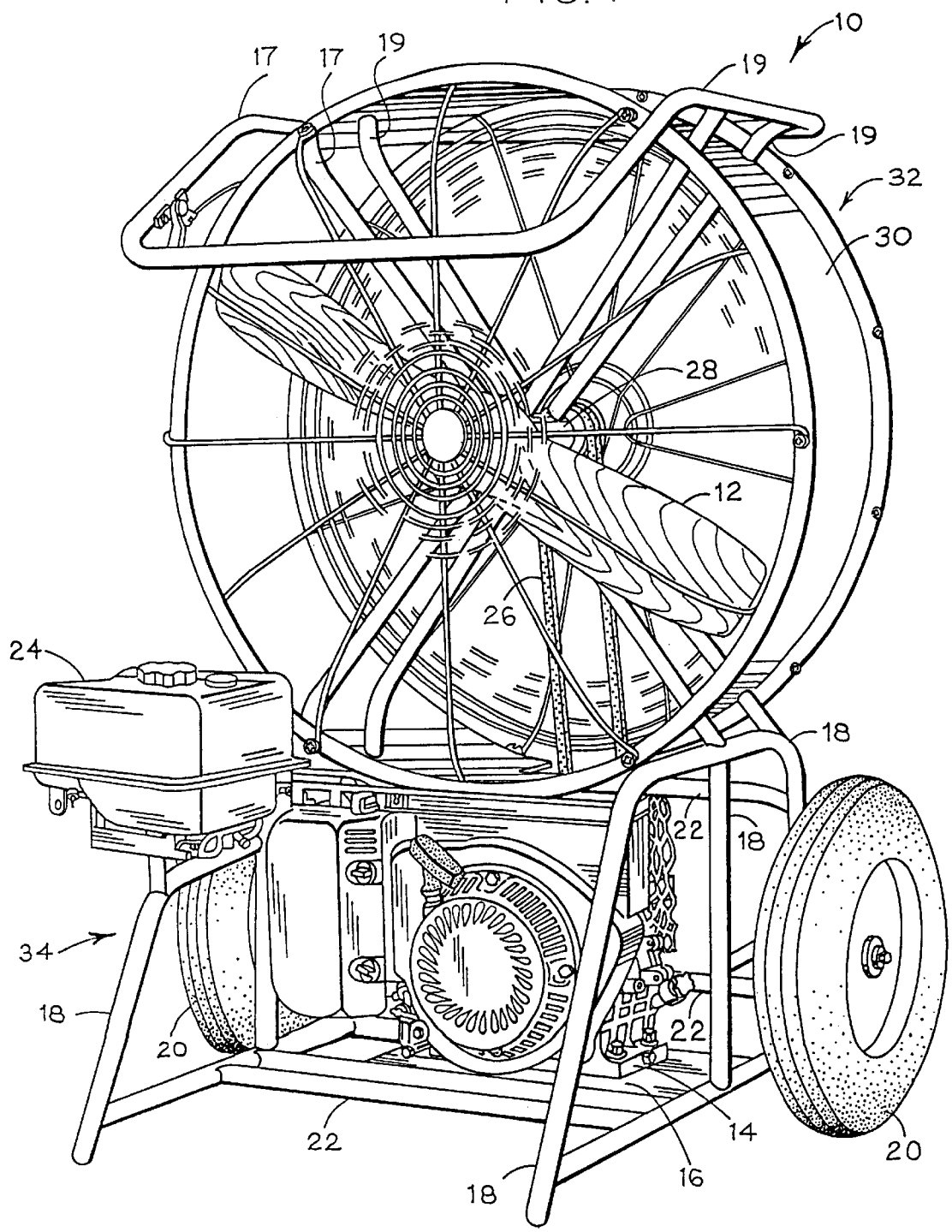
FIG. 1 is a perspective drawing.

With reference now to the drawings, the new and improved mobile fan embodying the principles and concept of the present invention and generally designed by the reference numerals 10 through 62 will be described.

Figure 2:
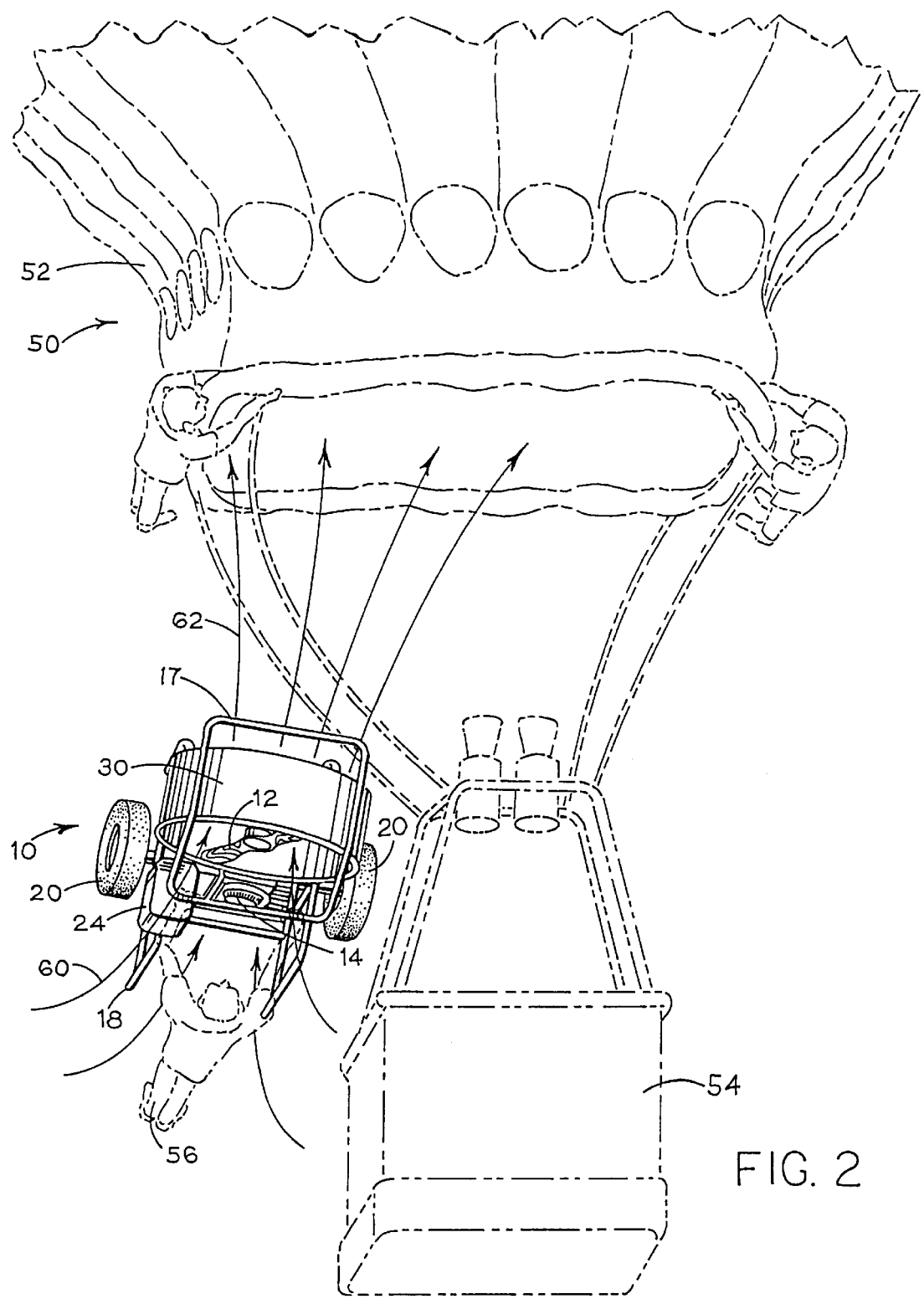
FIG. 2 is a perspective drawing from a view above the invention.

A preferred embodiment of the present invention as seen in FIGS. 1 and 2 may comprise a mobile fan assembly 10 used to inflate the envelope 52 of a hot air balloon 50 while simultaneously reducing the amount of debris from entering into envelope 52. Assembly 10 pulls air in the form of intake airflow 60 and directs it in the form of air stream 62 into envelope 52.

Assembly 10 comprises a frame assembly 34 with a cage 32 and the engine 14 mounted thereto. Frame assembly 34 comprises vertical support members 18, horizontal support members 22, a horizontal platform 16 and a pair of wheels 20.

Cage 32 comprises supports 17 and 19, control bar 21 and a cowelled side 30. Cowling side 30 prevents excess debris from entering into the air stream 62 thus reducing damage to envelope 52.

Propeller member 12 is mounted for rotation on an axis 28 as located within cage 32. Propeller 12 is powered by engine 14 which can be a standard gas/fuel engine by means of belt 26. Fuel reservoir 24 provides fuel to engine 14. Fuel reservoir 24 is mounted to frame assembly 34. Engine 14 is mounted to horizontal platform 16 further engine 14 is not mounted in a direct line of the intake airflow 60. This prevents excess engine gases from entering into airflow 62.

Control bar 21 and wheels 20 provide the user with the ability to relocate assembly 10 from time to time depending on circumstances.

While the foregoing description of the present invention has been set forth in terms of its application to the hot air balloon industry, it will be appreciated that the scope of the invention is not limited thereto, but can be applied economically and with favorable and advantageous results to other uses. By reason of the absolute mobility of the present invention, it can be moved anywhere as circumstances or economics of the hot air balloon industry may dictate.

The present mobile fan apparatus or assembly is an inexpensive, large-volume, air movement machine which is highly adaptable to a variety of uses, especially those requiring long-distance air displacement in areas with inadequate electric service, for example in the fields with no immediate electrical outlets in which hot air balloons are inflated.

What is claimed:

1. A method for inflating a balloon comprising the steps of:

positioning a mobile fan adjacent an envelope portion of a hot air balloon while simultaneously protecting the envelope from debris and also directing the air flow to the top of the envelope to minimize inflation time for the envelope, said mobile fan comprising:
a frame with vertical support members, horizontal support members, a horizontal platform, a-plurality of wheels and a handle,
a gasoline powered engine mounted to said frame,
a fuel reservoir mounted to said frame having a fuel line connected to said engine,
a fan assembly having a cage, an axis centrally located within said cage and a propeller rotationally mounted on said axis; and
a belt connected between said propeller and said engine with said engine providing means to rotate said belt, thus rotating said propeller to inflate said envelope, and
wherein said engine is mounted to said horizontal platform on said frame and wherein said horizontal platform is located below said fan assembly, and wherein said cage includes a cowled siding surrounding said fan assembly to prevent the introduction of debris or exhaust gases from entering the air stream developed by the rotation of said propeller during balloon inflation.

* * * * *